United States Patent Office 3,505,101
Patented Apr. 7, 1970

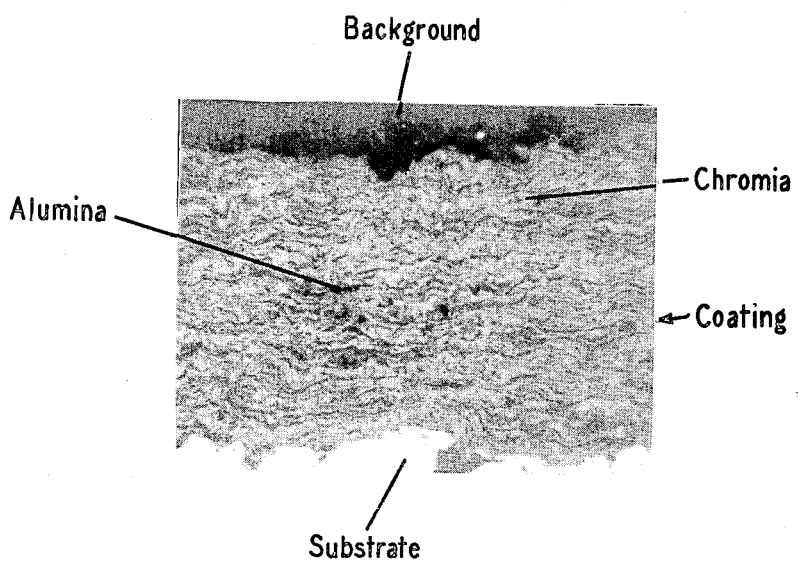

3,505,101
HIGH TEMPERATURE WEAR RESISTANT COATING AND ARTICLE HAVING SUCH COATING
John M. Koffskey, Jr., Indianapolis, Ind., and Larry E. Hayes, East Alton, Ill., assignors to Union Carbide Corporation, a corporation of New York
Continuation of applications Ser. No. 115,913 and Ser. No. 115,914, June 9, 1961. This application Oct. 27, 1964, Ser. No. 406,742
Int. Cl. B05b 7/20; B05c 9/14
U.S. Cl. 117—105.2
9 Claims

ABSTRACT OF THE DISCLOSURE

An abrasion resistant coating for a metallic substrate consisting essentially of from about 50 to 85 volume percent chromia with the remainder being alumina is provided.

---

This application is a continuation of applications Ser. Nos. 115,913 and 115,914, both filed June 9, 1961 and both now abandoned.

The present invention relates to a coating for use on metallic surfaces subjected to abrasion, shock and/or high temperature and more particularly to an article having a coating which is resistant to wear, shock and/or temperature.

As our modern industrial economy strives to increase productivity, the operating speeds of most machines and processes has been increased to the point at which wear damage is considerable. Various types of wear-resistant means or protective coatings have been tested extensively in an effort to minimize such wear, and to prolong the useful life of industrial equipment.

When employed as an outer coating to a surface, alumina is found to have a high degree of hardness and wear-resistance when contacting other surfaces or other hard materials. The alumina coating exhibits, however, extremely low wear-resistance, when mating against itself without the benefit of some form of lubrication. Furthermore, this type of coating is not completely acceptable in some applications, such as where high velocity friction is concentrated in a small area.

Still further, there is a present and ever-growing future need in the aeronautic and astronautic industries to provide protection to the outer surface and especially to the thin walled nose section of super high velocity missiles or space vehicles as they re-enter and pass through the earth's atmosphere. Air or atmospheric friction, especially during the re-entry period of a space flight can effect an excessively high temperature build up in the exposed outer surface to cause gross melting or other failure of virtually all presently known structural materials.

One means for protecting such materials involves coating the outer surface of the fuselage and/or nose section of the high velocity projectile with a layer of material that will resist thermal damage under high heat flux conditions. The protective coating, in order to function properly, should have a high melting point and should also have the desirable properties of high resistance to thermal shock, low transmission of thermal energy through the coating as indicated by a low back face temperature, and relatively low density.

In accordance with present requirements, high altitude missile components such as a nose cone which is to re-enter the earth's atmosphere after outer space travel, are usually though not necessarily, thin walled and light. The metal employed in the construction of this member may be stainless steel, titanium, aluminum, or similar high temperature resistant aircraft type materials. It has been found though that even when provided with special shapes to facilitate re-entry into the earth's atmosphere, such members unless adequately cooled or heat shielded will literally burn up and be completely consumed in a very short time due to the amount of frictional heat developed.

It is, therefore, an object of the invention to provide an article adapted to withstand severe wearing conditions imposed by high frictional forces and high temperatures at the surface thereof.

A further object is to provide a relatively thin-walled coated article having an outer protected surface exposed to a high velocity and high temperature resulting from the frictional heat caused by re-entry of the article into the earth's atmosphere.

A further object is to provide a wear-resistant coating for use on machine members which in normal operation are subjected to a highly concentrated abrasive forces.

A further object is to provide a protective coating for use on surfaces to protect said surfaces from the deleterious effects normally resulting from rubbing engagement with other surfaces or materials.

Still another object is to provide a machine member exhibiting good wear resistant characteristics on the surfaces thereof which are normally subjected to abrading wear.

In the drawing the sole figure illustrates a substrate having thereon the chromia-alumina coating of the invention.

In brief, the invention contemplates a coating or a coated article for use in applications where said article will have at least one surface exposed to severe wearing or abrading usage or high temperature and shock. The invention further provides that the exposed surface will be afforded protection against such wearing forces and high temperature by provision on said surface of a thin lamellar layer consisting of leaf-like microscopic particles disposed in dispersed order and in overlapping relationship as to be bonded to each other and to the said surface. The leaves comprising said layer being formed from comminuted particles of a coating composition made up of chromia and alumina, which particles are propelled at a high velocity against the surface to be coated by a hot gaseous stream and are thereby deformed into a flattened, leaf-like shape on contact with the surface.

The presently disclosed coating may be applied to the substrate material or article by any of several processes generally known to the art. For example, methods found to be suitable in forming the coating are fully described and claimed in U.S. Patents No. 2,714,563 and 2,861,900. These methods include the detonation process and the jet plating process respectively. It has also been found that the plasma jet coating process described in co-pending application Ser. No. 850,444 filed on Nov. 2, 1959 by R. M. Gage et al. now U.S. Patent No. 3,016,447 may also be utilized for applying the metallic layer.

To briefly and generically describe the aforementioned coating methods, an apparatus, or gun is provided for receiving a highly detonatable gaseous mixture. As the mixture is ignited and the resulting gases caused to expand in a substantially confined chamber, the coating composition in finely powered form may be introduced to the chamber or to the detonation stream. The chamber is provided with an egress passage leading into an elongated narrow barrel. As the hot, expanding gases pass from the chamber and into the barrel, at a high velocity, the particles of coating material are carried therewith. These particles upon being heated by the hot gas, may soften to a partially fluid state depending on the physical characteristics of the particular material.

Upon leaving the gun barrel, the softened, or fluidized particles are impinged against and strike the surface to be coated at a high velocity. The effect of this action is to flatten or deform said particles into the thin, leaf-like configuration, said leaves being bonded to the surface and mutually to each other. Successive detonations within the coating apparatus accompanied by successive additions of coating material cause a gradual build up of irregularly shaped and interlocked leaves into a composite lamellar layer.

The subject coating may be applied satisfactorily to various substrate surfaces so long as the surface is able to withstand the high temperature gas stream and is adapted to receive the coating material. As mentioned previously, the base material, or substrate may be made from a large number of materials including stainless steel, aluminum, or titanium, which have been formed into the desired shape.

A novel coating as herein described, overcomes many of the advantages attributed to an otherwise desirable alumina coating. This protective layer is formed from a coating material having a composition of about 50–85 volume percent chromia and 15–50 volume percent alumina. The layer is preferably applied to a desired base surface, or substrate by means of a high temperature, high velocity coating process. It has been found that the coating as applied may vary somewhat in composition from the composition of the powdered starting material. This differential is attributed to chemical changes or volatilization caused as a result of, or during the coating process. For example, coatings having an 80 volume percent chromia to 20 volume percent alumina mixture, when applied by the above-mentioned detonation plating process are found to have a final composition of about 65 volume percent chromia and 35 volume percent alumina. Similarly, a starting material composition of about 60 volume percent chromia 40 volume percent alumina when applied by the detonation process, results in a coating containing about 50 volume percent chromia and 50 volume percent alumina.

The thermally protected article contemplated by the present invention consists of a thin-walled body as for example a missile nose cone, said body having bonded to the outer surface thereof a chromia-alumina composite layer in which the chromia portion constitutes between 50 and 70 percent by volume, the remainder being alumina.

The improved wear-resistance of the instant chromia-alumina coating, or layer, is demonstrated by the following comparative data. A coating obtained from starting material containing 80 volume percent chromia and 20 volume percent alumina, when applied to a steel baseplate by means of the detonation plating process was subjected to a room temperature wet abrasion test. The coated test piece, when brought into mating contact against Meehanite test surface, was found to have the coating worn at a rate of 0.000046 gram/hr. Similarly, when mating against Ni-resist, another standard test surface, the chromia-alumina coating wore only 0.000024 gram/hr. Indicative of this wear resisting ability, it is well known and accepted as standard that a coating or material which wears away to the extent of about 0.002 gram/hr. is excellent wear-resistant.

In a wear test conducted at 1400° F. and under 500 p.s.i. contact pressure, the chromia-alumina coated surface when mating against Haynes alloy surface 25 wore about $3.5 \times 10^{-6}$ in./hr. Under these test conditions, it is well known that wear rates of less than $10 \times 10^{-6}$ in./hr. indicate excellent wear-resistance. All of the above chromia-alumina wear values are approximately one-third to one-half of the total wear values obtained for alumina coatings under comparable test conditions.

Exemplary of the excellent wear characteristics exhibited by the coating, when mating against itself under test conditions of 1400° F. and 500 p.s.i. contact pressure, the chromia-alumina coating wore away at about $4 \times 10^{-6}$ in./hr. over a 7 hour test period. This slight amount of wear is considered negligible on a coating that averages about 0.003 in. thick. In constrast, under comparable test conditions with alumina mating against itself, the alumina coating was found to be considerably worn after 5 hours and was almost completely worn away at the conclusion of the 7 hour test period.

The increased wear properties of the disclosed chromia-alumina coatings appear to be based to a large degree on the chromia content. If a chromia-alumina coating material containing less than about 50 volume percent chromia is employed, the resulting coating characteristics do not show any appreciable advantage over straight alumina. It has been found, however, that as the chromia content is increased beyond 50 volume percent, the wear resistance of the resulting coating also increases. One useful species of the protective layer provides a composition of about 60 volume percent chromia and 40 volume percent alumina. To overcome extreme abrading conditions of the type experienced in draw rolls used by the textile industry, a coating composition species containing about 80 volume percent chromia and 20 volume percent alumina is useful. If, however, the chromia content of the starting composition exceeds about 85 volume percent, some difficulty is encountered when the above-mentioned detonation plating process is employed. The overall useful coating composition range of the present wear-resistant layer is thus found to be between 50–85 volume percent chromia and 15–50 volume percent alumina. The preferred starting composition contains about 80 volume percent chromia and 20 volume percent alumina.

EXAMPLE I

Acetylene at 2.5 c.f.m. and oxygen at 3.0 c.f.m. were introduced to the ignition chamber of a detonation gun to form a detonatable mixture having an oxygen/carbon atomic ratio of about 1.2. A finely-divided powder mixture consisting of 80 volume percent chromia (200 mesh) and 20 volume percent alumina (400 mesh) was suspended in a nitrogen carrier gas stream of 0.6 c.f.m. The gas borne powder was introduced at a rate of 30 grams/min. to the barrel of the detonation gun, and thereby injected into the hot gaseous stream. The detonation mixture was ignited at a rate of about four times per second and the coating powder was impinged on a steel baseplate to form a dense, adherent coating composed of irregularly-shaped microscopic leaves disposed in interlocking and overlapping relationship with each other.

EXAMPLE II

Acetylene at 1.69 c.f.m. and oxygen at 2.71 c.f.m. were introduced into the ignition chamber of the detonation gun to form a detonatable mixture having an oxygen/carbon atomic ratio of about 1.6 nitrogen at 1.1 c.f.m. was also introduced to this mixture. A finely-divided powder mixture consisting of 80 volume percent chromia (−200 mesh) and 20 volume percent alumina (−400 mesh) was suspended in a nitrogen carrier gas stream of 0.4 c.f.m. The gas borne powder was introduced at a rate of 35 grams/min. to the barrel of the detonation gun. The detonatable mixture surrounding the coating particles thus contained about 25 volume percent nitrogen. The detonation mixture was ignited at about four times per second, and the coating powder gas impinged on a steel baseplate to form a dense, adherent coating.

It has been found that a preferred detonation coating process for applying the 80–20 chromia-alumina mixture employs an oxygen/carbon atomic ratio of about 1.6 with no nitrogen addition other than the powder carrier gas. Coatings obtained by this process have been tested and found to have a modulus of rupture of 19,000 p.s.i. and modulus of elasticity of about $9.0 \times 10^6$ p.s.i. These coatings have also been found to have excellent bond strength on the surface of base materials such as steel, copper, brass and aluminum.

EXAMPLE III

Acetylene at 2.25 c.f.m. and oxygen at 2.25 c.f.m were introduced to a detonation gun to form a detonatable mixture having an oxygen/carbon atomic ratio of 1.0. A finely-divided powder mixture consisting of 60 volume percent chromia (200 mesh) and 40 volume percent alumina (400 mesh) was suspended in a nitrogen carrier gas stream of 0.6 c.f.m. The gas borne powder was introduced at a rate of 30 grams/min. to the barrel of the detonation gun. The detonation mixture was repeatedly ignited so as to impinge the coating particles on a desired base material to form a coating.

In a still further demonstration of the utility of a coating obtained by one of the described processes, a starting material containing 60 volume percent chromia and 40 volume percent alumina and applied to a steel baseplate by means of the detonation plating process was subjected to a room temperature wet abrasion test. The test conditions employed tap water with standard test dust abrasive as lubricant, a contact load of 40 p.s.i. and relative speed between the contact surfaces of 510 ft./min. When mating against Hardened GA Meehanite, the chromia-alumina coating wore an undetectable amount. When mating against Ni-Resist, type 1, the chromia-alumina coating wore only 0.00012 gram/hr. It is well known that wear rates obtained in this test of 0.002 gram/hr. or less indicate excellent wear-resistance.

In a high load, low speed, dry rubbing test under conditions of 1400° F., employing no lubricant, 500 p.s.i. contact pressure and relative speed between contact surfaces of 10 ft./min., the chromia-alumina mating against Haynes alloy 25 wore $8.0 \times 10^{-6}$ in. depth/hr. Under identical conditions, the chromia-alumina coating mating against a chromium carbide coating containing nickel-chromium binder wore only $5.4 \times 10^{-6}$ in. depth/hr. Under these tests conditions, it is well known that wear rates of less than $10 \times 10^{-6}$ in./hr. indicate excellent wear-resistance. When mating against itself under the above latter set of test conditions, the 60–40 chromia-alumina coating wore only about $4 \times 10^{-6}$ in./hr. over a 7 hour test. These wear rates are all substantially negligible under typical wear conditions.

Another example of an article made by the above discussed process, a powder mixture of 60 volume percent chromia (200 mesh), and 40 volume percent alumina (400 mesh), was introduced to a detonation plating apparatus employing oxygen and acetylene as the components of the detonatable gas mixture. This mixture was intermittently fired and the resulting hot, high velocity, powder-gas effluent was impinged against the flat surface of a ¼ in. thick x 2 in. copper plate to form a ¼ in. thick chromia-alumina coating. The resulting coating density on examinataion was determined to be about 3.8 gram/cm.$^3$.

The coated test piece was then disposed at a 45° angle and subjected to impingement thereon of the hot, high velocity gas flow from a plasma jet testing device under heat flux conditions of about 1000 B.t.u./ft.$^2$ sec. for 10 seconds. The gas jet was about ½ in. dia. and the coated test piece was positioned 1 inch from the discharge end of the arc device. These test conditions were established to simulate in the test piece friction heating of a coated missile component during the period while re-entering the earth's atmosphere. Subsequent examination of the test piece indicated that there was no gross spalling of the coating nor separation from the baseplate, which result indicated good resistance to thermal shock. It was observed that while the front face temperature of the coated plate averaged about 2210° C. during the test, the back face temperature rise was only about 120° C. thus indicating a rather low coefficient of thermal conductivity of the coating. For test purposes, the front face temperature was measured by an optical pyrometer while the back face temperature was measured by a thermocouple embedded in the base material near the coating interface.

The ability of the present novel coating to withstand damage at high heat flux conditions and thus protect the base material is believed to be due at least in part to the unique combination in the layer of a high melting point and being a good thermal emitter so as to radiate heat away from the coated body. It is apparent, therefore, that the novel coating could also be used as a thermal insulation barrier in areas outside the missile and aircraft industries.

Further, while as mentioned above, it is believed that useful protective coatings could be prepared from mixtures containing 50–70 volume percent chromia and 30–50 volume percent alumina, the 60 volume percent chromia, 40 volume percent alumina mixture is the presently preferred composition. Also, while the disclosed coating is usually applied in a thin layer, the actual thickness obtainable is limited only by size of the article and its particular use.

What is claimed is:

1. A coating composition adapted to be applied to a metal substrate surface which comprises a particulalted mixture of between 50 and 85 percent by volume of chromia, the remainder being alumina.

2. A hard, abrasion resistant coating for a metal workpiece surface which comprises, a thin lamellar layer consisting of microscopic metallic oxide leaves disposed on said surface in dispersed order and in overlapping and interlocking relationship as to be bonded to each other and to the surface, said layer consisting of from 50 to 85 percent by volume of chromia microscopic leaves, the remainder of said leaves being alumina.

3. A coating substantially as described in claim 2 wherein the chromia leaves in the layer are about 80 percent by volume, the remainder of the leaves being alumina.

4. A coating substantially as described in claim 2 wherein the amount of chromia leaves in the layer is about 60 percent by volume, the remainder being alumina.

5. Method for applying a wear resistant coating to a metal surface which comprises: introducing a finely-divided powder mixture comprising between 50 and 85 percent by volume of chromia, the remainder of the mixture being alumina, into a detonation apparatus, introducing to said apparatus a detonatable gas mixture having an oxygen/carbon atomic ratio of about 1.2 to 1.6, igniting said detonatable mixture to form a detonation wave for carrying said powdered mixture from the apparatus in a high velocity stream, and impinging said gas borne powdered mixture onto the body to be coated, thereby deforming the particles of said mixture into a leaf-like lamellar structure, the leaves being bonded to each other and to the body surface.

6. A high temperature resistant article characterized by thermal and shock resistance to a high velocity stream of fluid passing along the outer surface thereof, said article comprising a thin walled body having an external metal surface, said surface being provided with a thin coating layer having a lamellar structure consisting of microscopic leaves disposed in overlapping, and interlocking relationship, said leaves being bonded to each other and to the surface article without substantial alloying at the article-coating-interface, said coating layer consisting of mutually bonded and intermixed leaf-like particles of chromia, and alumina, the chromia leaves being present in the coating in an amount within the range of from 50 to 70 percent by volume of the coating, the remainder of said particles being alumina.

7. A laminated product of manufacture characterized by thermal and shock resistance to high velocity streams contacting the product outer surface, said article including a thin wall defining the metal substrate of said laminated product, a coating bonded to said substrate to form a shock resistant thermal shield, said coating comprising a lamellar structure consisting of microscopic leaves disposed in overlapping and interlocking relationship to cover said surface, said leaves being bonded to each other and to the metal substrate without substantial alloying at the interface thereof to form a layer having a density of about 3.8 grams of said coating per cubic centimeter; the proportional amount of said leaves in the coating being about 50 to 70 percent by volume of chromia, the remainder being alumina.

8. An aircraft outer surface component characterized by high thermal and shock resistance when subjected to a high velocity flow of air along the surface thereof, said product comprising a formed thin-walled article fabricated from a metal normally unable to withstand the heat of friction caused by contact of said component with the atmospheric air, the outer surface of said article being provided with a protective coating bonded thereto, said coating comprising a lamellar layer of microscopic leaf-like particles disposed in overlapping and interlocking relationship to cover said surface, said leaf-like particles being mutually bonded to each other to form a coating, said particles being present in proportion of about 60 parts by volume of chromia to about 40 parts by volume of alumina.

9. An aircraft component substantially as described in claim 8, wherein the protective coating has a density of about 3.8 grams of coating per cubic centimeter.

References Cited

UNITED STATES PATENTS

| | | | |
|---|---|---|---|
| 2,714,563 | 8/1955 | Poorman et al. | 117—105 |
| 3,080,135 | 3/1963 | Steijn. | |
| 3,243,313 | 3/1966 | Aves | 117—105.2 |

ALFRED L. LEAVITT, Primary Examiner

J. H. NEWSOME, Assistant Examiner

U.S. Cl. X.R.

106—66; 117—127, 138, 169